United States Patent [19]

Otsuka et al.

[11] 4,180,344
[45] Dec. 25, 1979

[54] SLIDABLE TYPE CONSTANT VELOCITY UNIVERSAL JOINT

[75] Inventors: Nobuyuki Otsuka, Kawagoe; Seiichi Hirai, Sayama; Motoshige Sogabe, Asaki, all of Japan

[73] Assignee: Honda Giken Kogyo Kabushiki Kaisha, Tokyo, Japan

[21] Appl. No.: 951,607

[22] Filed: Oct. 13, 1978

[30] Foreign Application Priority Data

Feb. 13, 1978 [JP] Japan ............... 53-1407153
Mar. 13, 1978 [JP] Japan ............... 53-3085453

[51] Int. Cl.$^2$ ............................................. F16D 3/00
[52] U.S. Cl. .................................... 403/57; 64/21
[58] Field of Search ............... 403/57, 58, 74; 64/21

[56] References Cited

U.S. PATENT DOCUMENTS

| | | | |
|---|---|---|---|
| 3,664,152 | 5/1972 | Macielinski | 64/21 X |
| 3,789,626 | 2/1974 | Girguis | 64/21 |
| 4,008,582 | 2/1977 | Welschot | 64/21 |
| 4,027,927 | 6/1977 | Turner | 64/21 |

Primary Examiner—Wayne L. Shedd
Attorney, Agent, or Firm—Haseltine, Lake & Waters

[57] ABSTRACT

A joint of the type with an outer member having an inner cylindrical surface provided with an inner member having an outer diameter spherical surface and a cage member mounted on the inner member having an inner spherical surface and an outer diameter spherical surface which are eccentric with respect to each other. The cage member is provided with plural balls mounted in its respective windows, and the respective balls are in engagement with corresponding respective pairs of longitudinal directional guide grooves made in mutually facing surfaces of the outer member and the inner member. There is also provided an annular guide member mounted at its inner spherical surface and its outer cylindrical surface so as to be interposed between the cage member and the outer member.

2 Claims, 7 Drawing Figures

SLIDABLE TYPE CONSTANT VELOCITY UNIVERSAL JOINT

BACKGROUND OF THE INVENTION

The present invention relates to a slidable type constant velocity universal joint which is used chiefly in a front-engine front-drive type motorcar in such a manner that the same is interposed between an output shaft of a transmission connected to an engine and a wheel shaft connected to a front wheel disposed on the side thereof.

The prior art has known of such a type of universal joint of this kind that an outer member has an inner diameter cylindrical surface provided there in with an inner member having an outer diameter spherical surface and a cage member mounted on the inner member and having an inner diameter spherical surface and an outer diameter spherical surface which are eccentric to each other; a cage member is provided with plural balls mounted in respective windows, and the respective balls are in engagement with corresponding respective pairs of longitudinal directional guide grooves made in mutually facing surfaces of the outer members and the inner member. It is usual with this type to be so arranged, that the cage member is in direct contact, at its outer diameter spherical surface, with the inner diameter cylindrical surface of the outer member. This arrangement gives rise to inconveniences, i.e. that because the contact between the cage members and outer member becomes a linear contact, the two members are subjected to large pressure contact forces against each other, and consequently the two are liable to be damaged mutually and are made difficult to make mutual smooth slide movement. Furthermore, such an occasion is taken into consideration that the outer member and the inner member are mutually bent.

This arrangement also gives rise to an inconvenience that each ball tends to be pushed and accordingly the cage member is given a moment about the joint center. Consequently, there is generated especially large pressure contact forces at upper and lower contact points at which the cage member and the outer member are in contact one with another and thereby striking marks are liable to be formed at the contact points.

SUMMARY OF THE INVENTION

The present invention is intended to overcome the defects of the prior art.

According to the invention, a joint of the type with an outer member having an inner cylindrical surface provided with an inner member having an outer diameter spherical surface and a cage member mounted on the inner member having an inner spherical surface and an outer diameter spherical surface which are eccentric with respect to each other. The cage member is provided with plural balls mounted in its respective windows, and the respective balls are in engagement with corresponding respective pairs of longitudinal directional guide grooves made in mutually facing surfaces of the outer member and the inner member. There is also provided an annular guide member mounted at its inner spherical surface and its outer cylindrical surface so as to be interposed between the cage member and the outer member. In order that mutual slide movement between the guide member and the outer member may become smooth and light, it is preferable that oil such as grease or the like, may be held always between the mutually facing surfaces of the two members.

According to another feature of the invention, the outer cylindrical surface of the guide member is formed with at least one groove for oil.

The present invention will be best understood with respect to the accompanying specification, claims and drawings.

IN THE DRAWINGS

DESCRIPTION OF THE INVENTION

Figure 1:
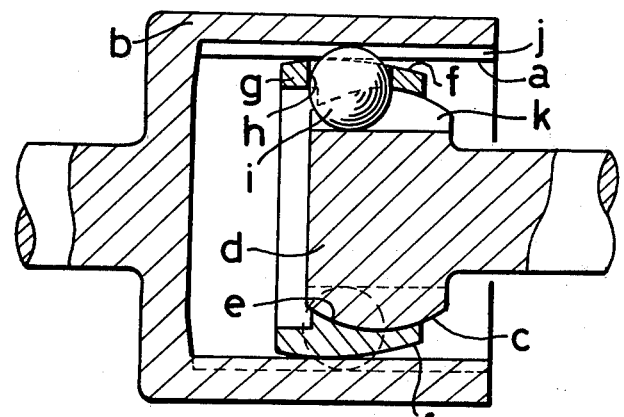
FIG. 1 is a sectional side view of a conventional prior art example.
Figure 2:
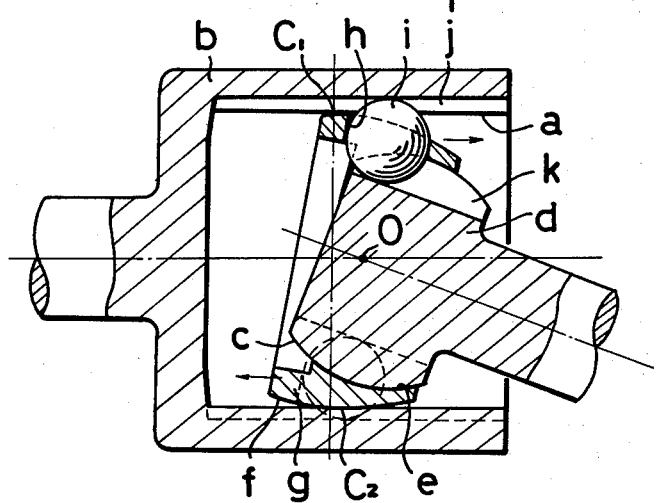
FIG. 2 is a sectional side view of FIG. 1 under a bent condition thereof.

The embodiments shown in FIGS. 1 and 2 represent prior art structure as described hereinbefore. The structure as set forth in FIG. 1 is directed to a universal joint with an outer member b; an inner cylindrical surface with an inner member d and an outer spherical surface c, cage member g having an inner spherical surface e and outer spherical surface f. The cage member has plural balls i in windows h with engaging grooves j, k.

Figure 3:
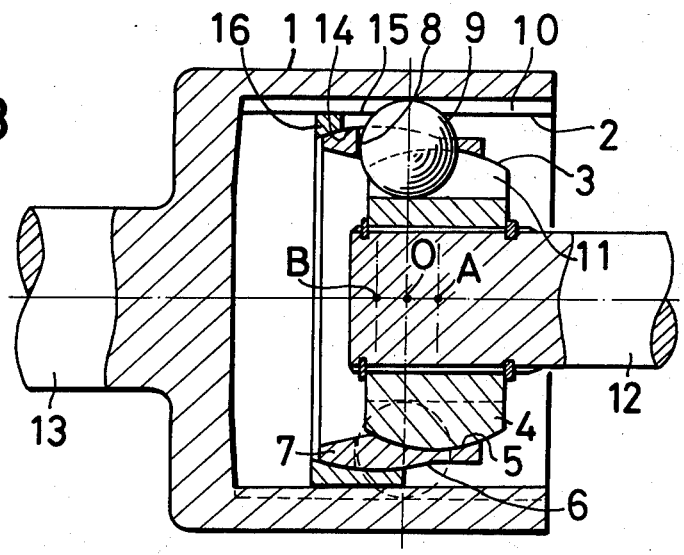
FIg. 3 is a sectional side view of one embodiment of the invention.
Figure 4:
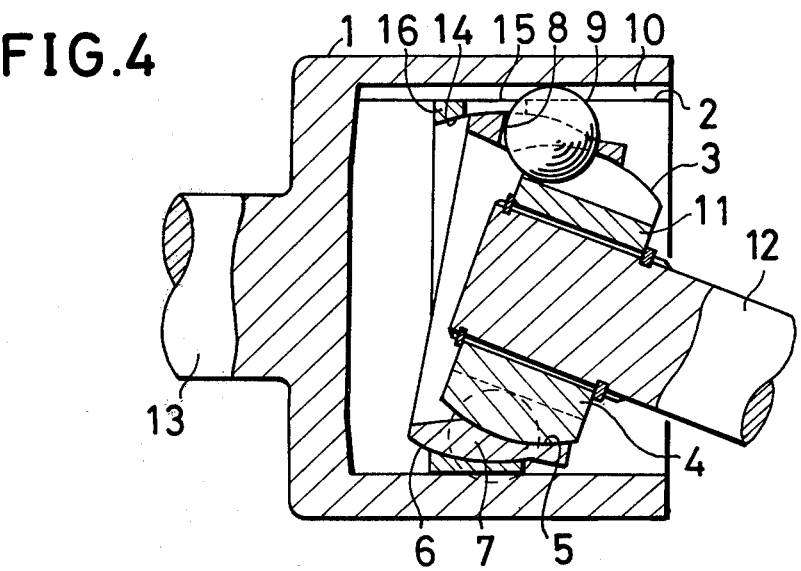
FIG. 4 is a sectional side view of FIG. 3 under a bent condition thereof.

The outer member b and inner member d are mutually bent per FIG. 2. FIGS. 3 and 4 show one example of the invention, numeral 1 denotes an outer member and numeral 2 denotes an inner diameter cylindrical surface thereof, and the outer member 1 is provided therein with an inner member 4 having an outer diameter spherical surface 3. A cage member 7 is mounted on the inner member 4 and has an inner diameter spherical surface 5 and an outer diameter spherical surface 6 which are eccentric to each other. The cage member 7 is provided with plural ball windows 8 made therethrough and disposed circumferentially, and respective balls 9 are mounted in the respective windows 8. The balls 9 are in engagement with corresponding respective pairs of longitudinal directional guide grooves 10, 11 made in mutually facing surfaces of the outer member 1 and the inner member 4. Referring to these Figures, 0 denotes the center of the joint. The inner diameter spherical surface 5 and the outer diameter spherical surface 6 of the cage member 7 are eccentric to each other as mentioned before, and thus the respective centers of those surfaces are a point A and point B located on both outsides of the point 0. Referring to the Figures, numerals 12, 13 denote respective rotary shafts extending both outward from the inner member 4 and the outer member 1, respectively, and one of the two is composed of an output shaft of a transmission driven by an engine in a motorcar, for instance, and the other of the two is formed of a wheel shaft connected for example to a wheel on the outside thereof.

The above is not especially different from that in the conventional joint. According to the invention, in such a type as above, an annular guide member 16 is mounted at an inner diameter spherical surface 14 and an outer diameter cylindrical surface 15 thereof, so as to be interposed between the cage member 7 and the outer member 1. Consequently, the outer member 1 and the inner member 4 are in mutually slidable engagement through the inner diameter cylindrical surface 2 of the outer member 1 and the outer diameter cylindrical surface 15 of the guide member 16. At the same time the members 1, 4 are in mutually tiltable engagement through the inner diameter spherical surface 14 of the guide member 16 and the outer diameter spherical surface 6 of the cage member 7.

The operation of the apparatus will now be explained as follows:

The joint in the case where the inner member 4 and the outer member 1 are in alignment with each other is as shown in FIG. 3. In this case rotary movement of one of the two members 4, 1 is transmitted to the other through the respective balls 9 and thus a constant velocity power transmission is obtained between the two members 4, 1. On the occasion where the two members 4, 1 are mutually bent, the joint is as shown in FIG. 4. For instance, in that structure, the cage member 7 is inclined to a bisected angle position and thus a substantial constant velocity property power transmission as above is obtained between the two members 4, 1. During this operation, the two members 4, 1 are allowed to move mutually in the longitudinal direction. This is not especially different from that in the conventional joint. According to this invention, however, the guide member 16 is interposed between the outer member 1 and the cage member 7 as mentioned previously so that the two members 1, 7 are in surface contact one with another through the member 16. Consequently the inconvenience and difficulty as mentioned before in the conventional embodiments wherein the two members 1, 7 are in direct linear contact one with another are no longer present. Additionally, the guide member 16 is moved slidably at its outer diameter cylindrical surface 15 along on the inner diameter cylindrical surface 2 of the outer member 1, so that the mutual movement of the inner member 4 and the outer member 1 become smooth and stable. Furthermore, the guide member 16 serves to guide at its inner diameter spherical surface 14 the outer diameter spherical surface 6 of the cage member 7, so that the inclining movement thereof becomes smooth and stable and can maintain a constant velocity.

Figure 5:
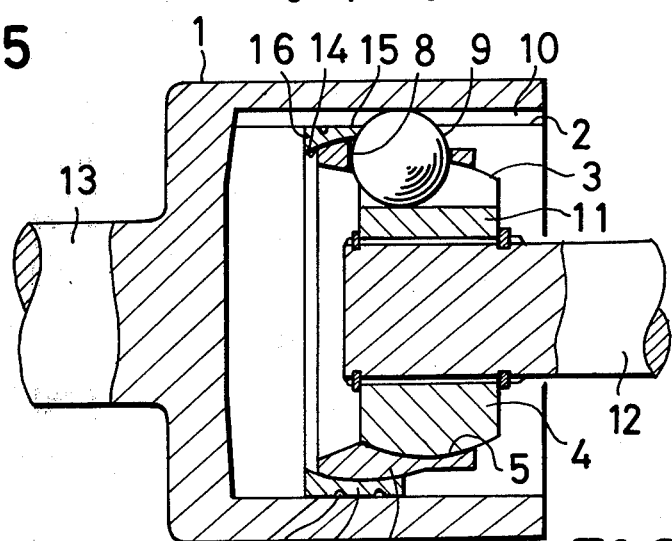
FIG. 5 is a sectional side view of a modified example of the invention.
Figure 6:
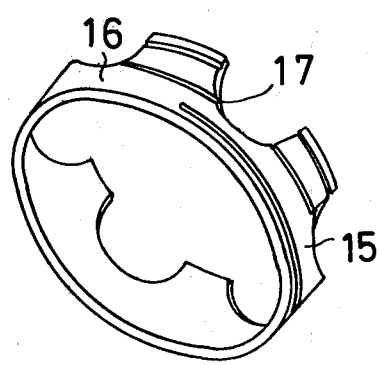
FIG. 6 is a perspective view of a guide ring thereof.
Figure 7:
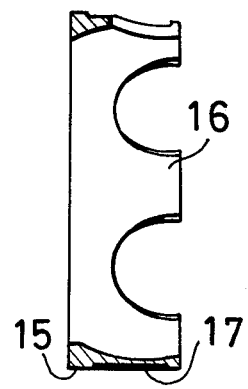
FIG. 7 is a sectional view of a modified example thereof.

In a modified example of the invention as shown in FIGS. 5 to 7, the outer diameter cylindrical surface 15 of the guide member 16 is provided with a groove 17 for oil. The groove 17 may be a single one or a plurality extending circumferentially as shown in FIGS. 5 and 6 or extending longitudinally as shown in FIG. 7. In the case of a circumferential structure, the groove 17 may be a spiral as shown clearly in FIG. 6. The groove 17 serves to hold a lubricating oil such as grease or the like, and thereby it can be assured that the lubricant always lies between the two surfaces 2, 15 and consequently the mutual slide movement of the two may become smooth and light.

Thus, according to the invention, the guide member is mounted at the inner diameter spherical surface and the outer diameter cylindrical surface thereof between the cage member and the outer member, so that such difficulty existing where the cage member and the outer member are in direct contact one with another is not present. In addition, the straight movement of the inner member and the inclining movement of the cage member following the inner member become smooth and stable to thereby improve the constant veolcity property.

Many modifications and variations of the present invention are possible in light of the above teachings. It is, therefore, to be understood that within the scope of the appended claims, the invention may be practiced otherwise than as particularly described.

We claim:

1. A slidable type constant velocity universal joint having an outer member, said outer member being formed of an inner cylindrical surface, and provided therein with an inner member having an outer spherical surface; a cage member; said cage member being mounted on the inner member and having an inner spherical surface and an outer spherical surface respectively; each being eccentric with respect to each other; a plurality of balls provided in said cage member, being mounted in respective windows; guide grooves formed in mutually facing surfaces of said outer member and the inner member; said respective balls being in engagement with corresponding respective pairs of longitudinal directed guide grooves; wherein: an annular guide member means an annular guide member means disposed between said cage member and said outer member, said guide member means having an outer cylindrical surface in proximity to said outer member and an inner part-spherical surface in proximity to said cage member for permitting slidable engagement between said outer member and said inner member.

2. A slidable type constant velocity universal joint as claimed in claim 1, wherein: the outer spherical surface of the guide member means is provided with at least one groove for oil.

* * * * *